US005734843A

United States Patent [19]
Gephardt et al.

[11] Patent Number: 5,734,843
[45] Date of Patent: Mar. 31, 1998

[54] REVERSE DATA CHANNEL AS A BANDWIDTH MODULATOR

[75] Inventors: Douglas D. Gephardt; Brett B. Stewart; Rita M. Wisor; Drew J. Dutton, all of Austin; Steven L. Belt, Pflugerville, all of Tex.

[73] Assignee: Advanced Micro Devices Inc., Sunnyvale, Calif.

[21] Appl. No.: 476,872

[22] Filed: Jun. 7, 1995

[51] Int. Cl.⁶ .................................................. G06F 13/00
[52] U.S. Cl. .......................................... 395/287; 395/877
[58] Field of Search .................................. 395/287, 877; 370/84

[56] References Cited

U.S. PATENT DOCUMENTS

| | | | |
|---|---|---|---|
| 4,296,469 | 10/1981 | Gunter et al. | 395/287 |
| 4,378,588 | 3/1983 | Katzman et al. | 395/877 |
| 4,538,147 | 8/1985 | Grow | 340/825.05 |
| 4,821,174 | 4/1989 | Webb et al. | 370/88 |
| 4,837,739 | 6/1989 | McGill et al. | 371/8 |
| 4,849,968 | 7/1989 | Turner | 370/94 |
| 5,083,260 | 1/1992 | Tsuchiya | 395/293 |
| 5,159,447 | 10/1992 | Haskell et al. | 358/133 |
| 5,247,689 | 9/1993 | Ewert | 395/800 |
| 5,414,820 | 5/1995 | McFarland et al. | 395/287 |
| 5,506,844 | 4/1996 | Rao | 370/84 |
| 5,506,969 | 4/1996 | Wall et al. | 395/287 |
| 5,528,765 | 6/1996 | Milligan | 395/287 |
| 5,541,919 | 7/1996 | Yong et al. | 370/61 |
| 5,561,771 | 10/1996 | Harriman, Jr. et al. | 395/200.13 |
| 5,566,175 | 10/1996 | Davis | 370/84 |
| 5,579,530 | 11/1996 | Solomon et al. | 395/855 |

*Primary Examiner*—Ayaz R. Sheikh
*Attorney, Agent, or Firm*—Foley & Lardner

[57] ABSTRACT

A method of allocating bandwidth among a plurality of devices communicatively connected through a data bus provides for determining a data need of at least one of the plurality of devices, allocating portions of the data bus to the devices in response to the data need, and transmitting data between the devices on the allocated portions of the data bus. The portions of the data bus can be subbusses, each comprising at least one bit line. The data need can be based on a measure of fullness of a buffer corresponding to the at least one device. The data need can be provided as feedback from the buffer to a data bus controller which allocates the portions of the data bus. The method can use rules for assigning the subbusses which are stored in a memory. A processor can change the rules to accommodate changing conditions in the data bus. Also provided is a data communication system comprising a dynamically reconfigurable data bus, a data bus controller connected to the dynamically reconfigurable data bus for configuring subbusses of the data bus, a plurality of receiving devices connected to the data bus, and a feedback connection from at least one of the receiving devices to the data bus controller, wherein the data bus controller configures the subbusses in accordance with feedback received over the feedback connection. A memory can be connected to the data bus controller for storing rules for use by the data bus controller in configuring the subbusses. A processor can change the rules to accommodate changing conditions in the data bus.

9 Claims, 5 Drawing Sheets

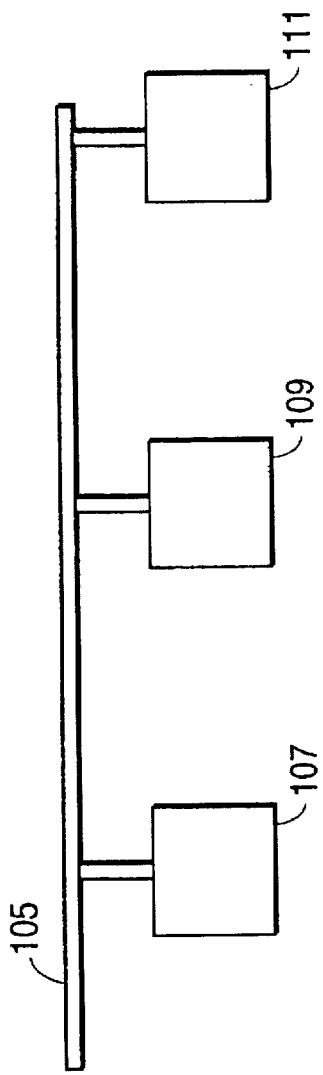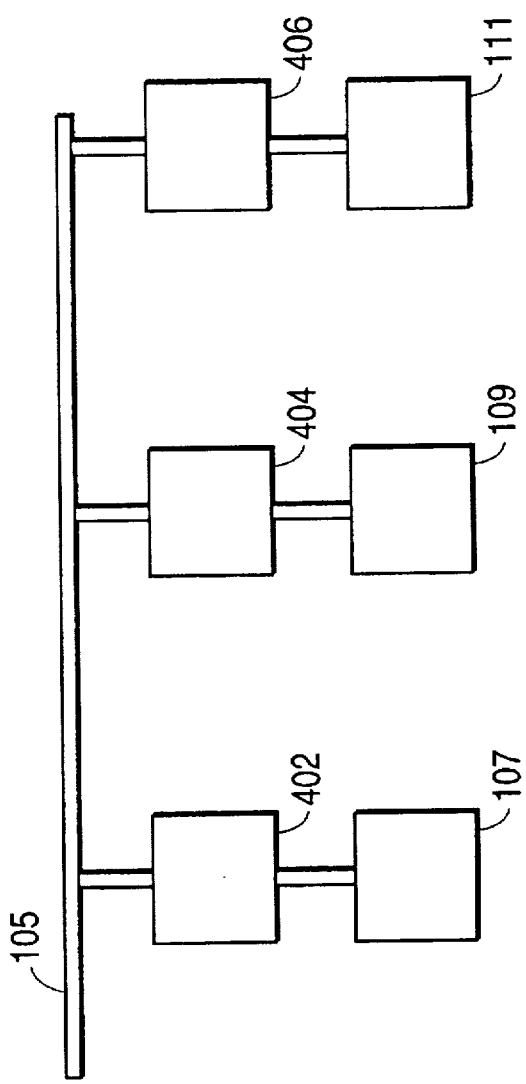

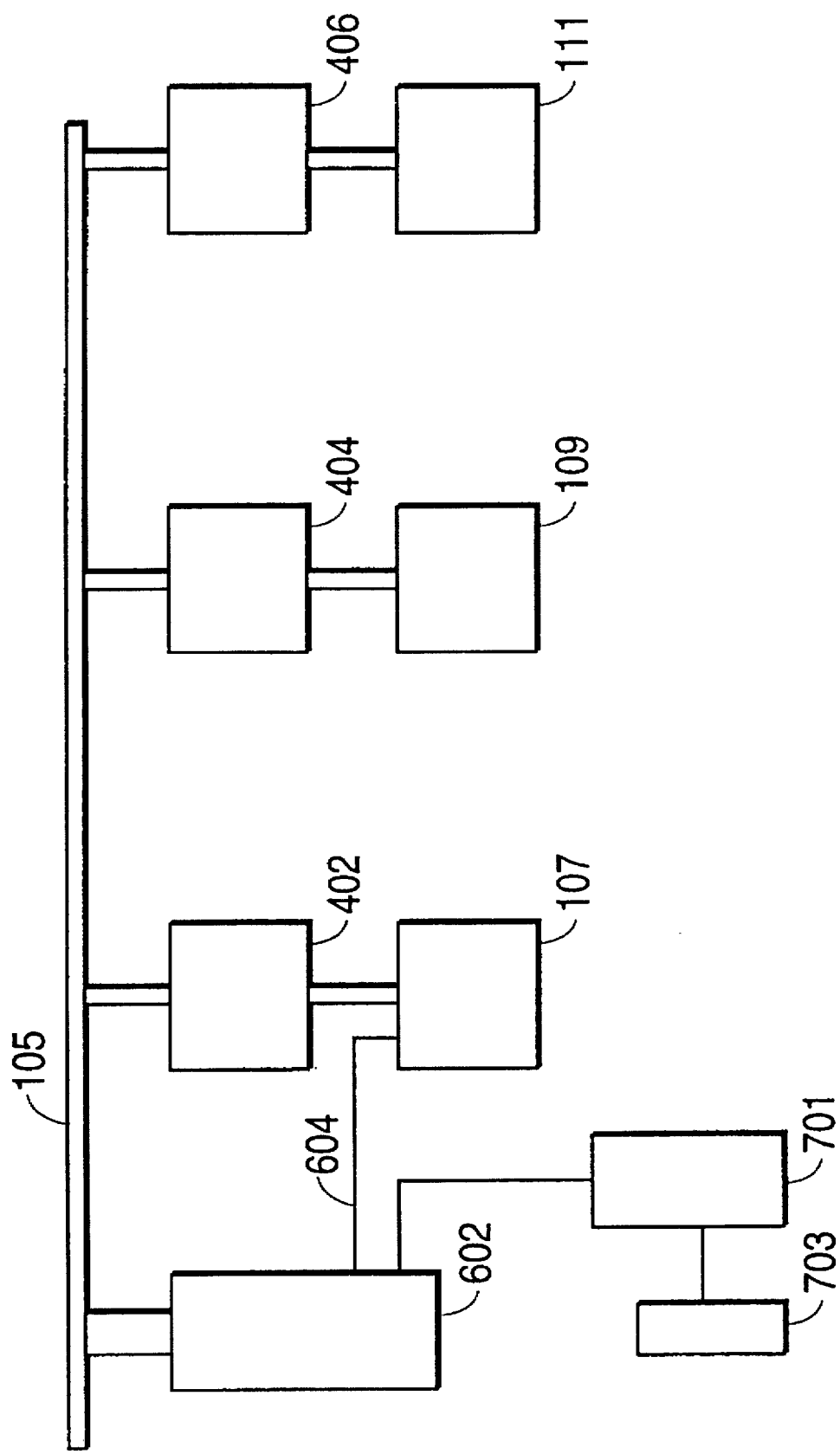

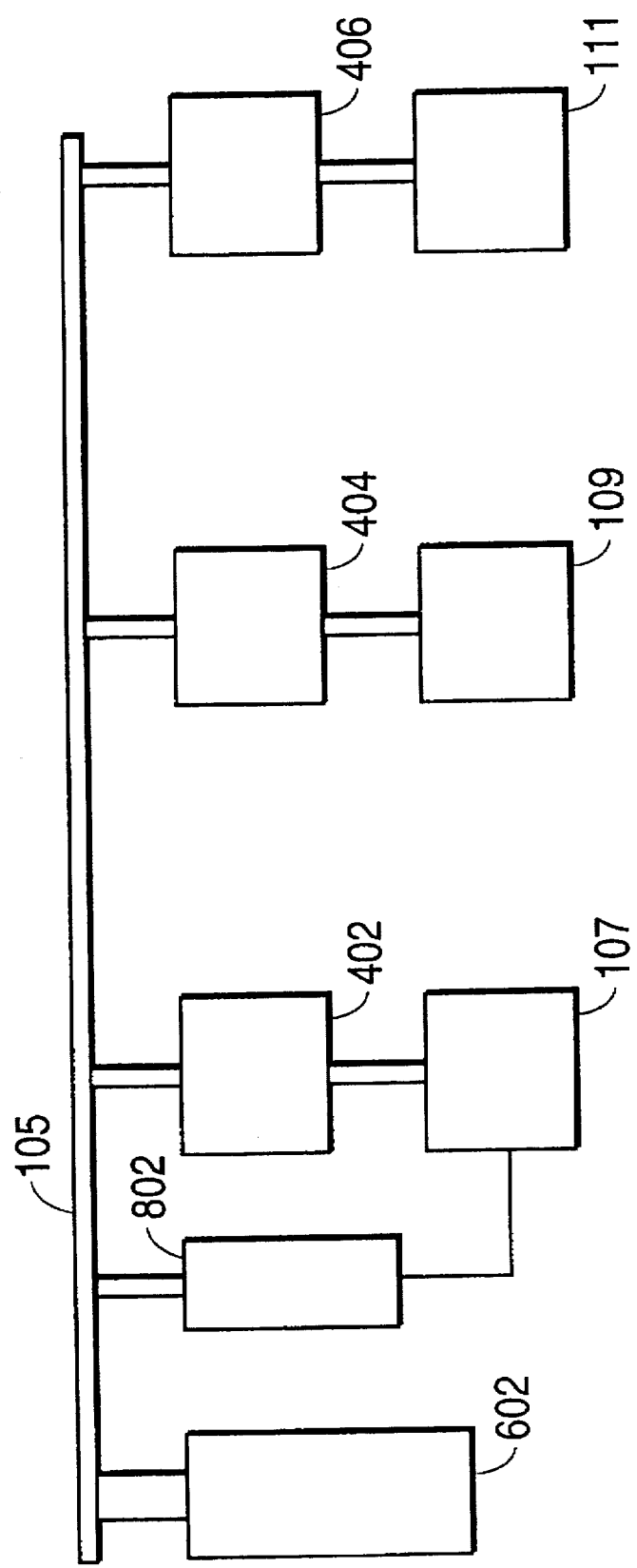

REVERSE DATA CHANNEL AS A BANDWIDTH MODULATOR

BACKGROUND OF THE INVENTION

In a conventional data bus over which a plurality of processing devices communicate, the amount of bandwidth occupied by any one device is a function of the amount of data transmitted by the device and the size of the data in bits. For example, a processing device which relatively infrequently transmits long streams of data may occupy as much of the bus bandwidth as a device which more frequently transmits shorter messages. In a conventional system, the processing device which gains access to the bus often controls the bus until it has completed transmitting its data. If this is a long data transfer, other devices wait in a queue to gain bus access, depending on the parameters of a bus contention resolution scheme, which allocates bus access.

In a related co-filed application, entitled Dynamically Reconfigurable Data Bus, and incorporated herein by reference, a data bus is provided with the ability to be reconfigured into a plurality of subbusses. Each subbus carries data independently of the other subbusses. The data bus can be reconfigured to move bit lines from one subbus to another subbus. The reconfiguration can occur in accordance with information transfer needs according to one or more information flow templates.

SUMMARY OF THE INVENTION

It is an object of the invention to provide a method of allocating access to a data bus among devices connected to the data bus in a dynamic manner based on feedback from the receiving devices. The data bus can be the conventional data bus or the dynamic data bus described in the aforementioned co-filed application.

For example, in a preferred embodiment, the invention provides access to the dynamic data bus by allocating the bandwidth, in terms of the number of bit lines of each subbus, in accordance with feedback from the devices receiving data from the subbusses.

The invention provides a method of allocating bandwidth among a plurality of devices communicatively connected through a data bus by determining a data need of at least one of the plurality of devices, allocating portions of the data bus to the devices in response to the data need, and transmitting data between the devices on the allocated portions of the data bus.

In one embodiment, the portions of the data bus are subbusses, each comprising at least one bit line. The data need can be based on a measure of fullness of a buffer corresponding to the at least one device. The data need can be provided as feedback from the buffer to a data bus controller which allocates the portions of the data bus.

In an alternative embodiment, rules for assigning the subbusses can be stored in a memory and a processor can change the rules to accommodate changing conditions in the data bus.

It is another object of the invention to provide a data communication system comprising a dynamically reconfigurable data bus, a data bus controller connected to the dynamically reconfigurable data bus for configuring subbusses of the data bus, a plurality of receiving devices connected to the data bus, and a feedback connection from at least one of the receiving devices to the data bus controller, wherein the data bus controller configures the subbusses in accordance with feedback received over the feedback connection.

This embodiment of the invention can also include a memory connected to the data bus controller, the memory storing rules for use by the data bus controller in configuring the subbusses. Further, this embodiment of the invention can include a processor connected to the memory, the processor changing the rules to accommodate changing conditions in the data bus.

BRIEF DESCRIPTION OF THE DRAWINGS

These and other objects of the invention will be apparent to one of ordinary skill upon review of the description and figures, wherein:

FIG. 1 shows a data bus connected to data communication devices;

FIG. 4 shows an alternative configuration of the data bus connections of FIG. 1, wherein each device is connected to the data bus via a buffer;

FIG. 7 shows an alternative to the first embodiment of FIG. 6; and

FIG. 8 shows a second embodiment of the invention, providing feedback to a data bus controller.

DETAILED DESCRIPTION

FIG. 1 shows data bus 105 connected to information processing devices 107, 109 and 111. In the example described in the aforementioned co-filed application, data bus 105 contains a plurality of information channels which transfer information to devices such as devices 107, 109 and 111. For example, data bus 105 may contain 64 parallel information channels. These information channels enable devices 107, 109 and 111 to receive communications of up to 64 bits of parallel information from data bus 105.

Figure 2:
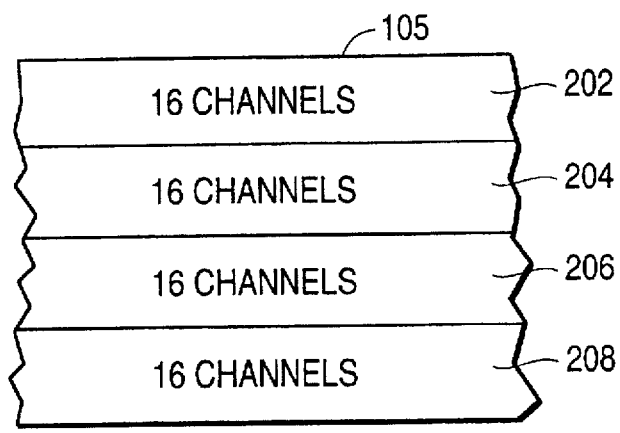
FIG. 2 shows one configuration of subbus 105 of FIG. 1 in accordance with the aforementioned co-filed application.

FIG. 2 shows one configuration of data bus 105 wherein data bus 105 is configured into four 16-bit subbusses 202, 204, 206 and 208. In this configuration, each of the subbusses can transmit data on its information channels independently of the other subbusses. For example, subbus 202 can transfer data to device 109 at the same time that subbus 204 is transferring data to device 107.

Also, subbusses 206 and 208 can transfer data in parallel with the data transfers occurring on subbusses 202 and 204. These data transfers may be, for example, to device 111 on bus 206, and to another device in the system (not shown) on subbus 208.

The data flow in the information channels of the subbusses is thus configured such that each of the information channels within a subbus transfers information to the same target device as the other information channels in that subbus. However, the target device for the information channels of one subbus can be completely different from that of another subbus.

Figure 3:
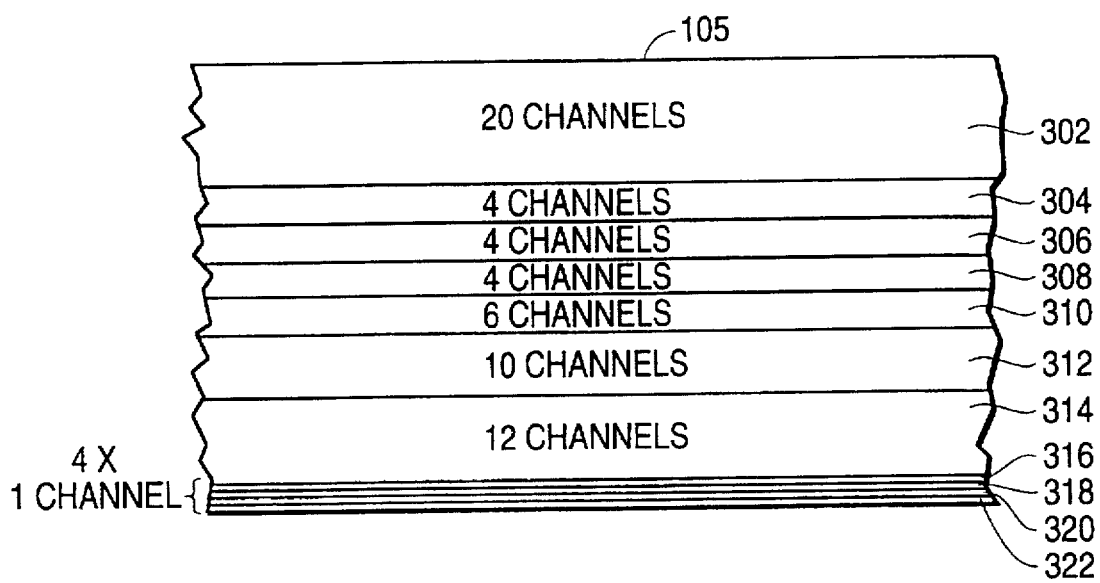
FIG. 3 shows another configuration of subbus 105 of FIG. 1 in accordance with the aforementioned co-filed application.

In accordance with changing mission requirements, data bus 105 can be reconfigured to a new configuration, such as that shown in FIG. 3. This configuration shows subbus 302 containing 20 information channels, subbusses 304, 306 and 308 each containing four information channels, subbus 310 containing six information channels, subbus 312 containing 10 information channels, subbus 314 containing 12 information channels, and subbusses 316, 318, 320 and 322 each containing one information channel.

A comparison between FIGS. 2 and 3 shows that subbus 302 comprises the 16 information channels of subbus 202 as well as four information channels from subbus 204. Similarly, the other subbusses of FIG. 3 comprise information channels which were organized in a different configuration in the subbus structure of FIG. 2. Therefore, as bus 105 is dynamically reconfigured, a given information channel can change from being associated with one subbus to being associated with another subbus. Also, as shown in FIG. 3, a given information channel may become a subbus on its own, as is the case for subbusses 316, 318, 320 and 322.

FIG. 4 shows an alternative configuration, wherein buffers 402, 404 and 406 are respectively connected between bus 105 and devices 107, 109 and 111. In this example, devices 107, 109 and 111 can be viewed as receive devices, each receiving data over a portion of bus 105. Each portion of bus 105 can be a subbus comprising one or more bit lines.

For example, presume devices 107, 109 and 111 are display devices, each receiving display information from its corresponding buffer which is connected to a corresponding subbus of data bus 105. In order to display "real time" video, each display device must refresh its display at a rate of 30 frames per second. Thus, each display device must retrieve one frame of information from its corresponding buffer every 1/30th of a second.

Figure 5:
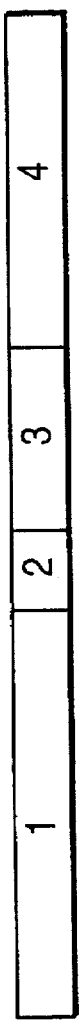
FIG. 5 shows an example of a data stream corresponding to four consecutive frames 1-4 to be displayed on a given display device of FIG. 4.

However, the frames received by the display devices are not necessarily of the same size. FIG. 5 shows an example of a data stream corresponding to four consecutive frames 1–4 to be displayed on a given display device. The size of each frame shown in this example corresponds to the amount of information (number of bits) contained in the frame.

For example, frame 1 is the initial frame and therefore provides a complete set of information to change virtually every pixel on the display from a state wherein no image is visible on the display screen to a state wherein the pixels collectively comprise an image. Frame 1 therefore contains a large amount of information.

Frame 2, on the other hand, may carry relatively little information, and therefore may be relatively small compared to frame 1. This would be the case if few of the pixels actually change between frames 1 and 2. For example, if the background portion of the image is constant between frames 1 and 2, and the only difference between frames 1 and 2 is a change of position associated with an object within the image, then frame 2 need only contain information related to the pixels associated with the changed position of this object.

On the other hand, suppose a greater degree of change exists between frames 2 and 3. For example, additional objects may change relative position between these two frames. Thus, frame 3 contains a greater amount of information than frame 2. Further, presume frame 4 contains even more information, perhaps because the background of the image changes between frames 3 and 4. Thus, the amount of information contained in a given frame is related to the amount of difference that exists between the image in the given frame and the image in an immediately preceding frame.

Presume, for example, that frames 1–4 are sent to display device 107 via subbus 204 (FIG. 2) and buffer 402 (FIG. 4). Further, presume that as device 107 reads information from buffer 402, additional information is placed into buffer 402 via subbus 204. Thus, buffer 402 is a first-in, first-out buffer. As shown in FIG. 4, the data flow through buffer 402 can be viewed as data flowing into the top of buffer 402 and out of the bottom of buffer 402. Ideally, each time device 107 reads a frame of information out of the bottom of buffer 402, a new frame of information is stored into the top of buffer 402. In such an ideal case, buffer 402 remains relatively full and is constantly prepared to provide the next frame of information to device 107, either on demand, or in accordance with a synchronized clock at a rate such as 30 frames per second.

Figure 6:
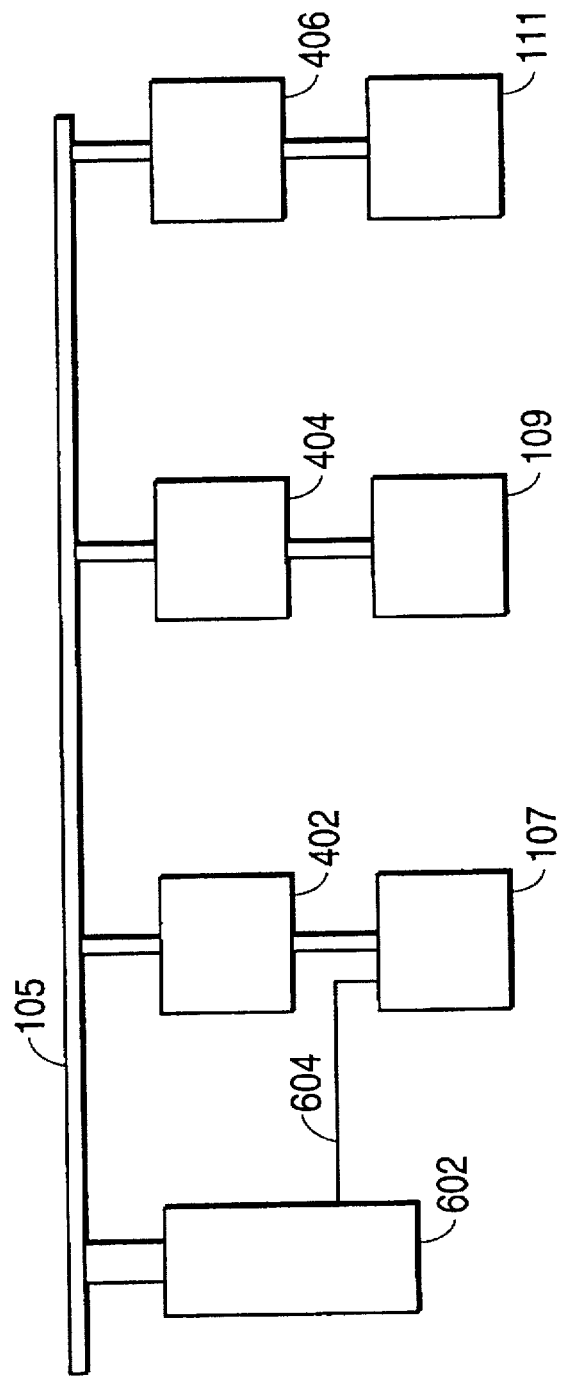
FIG. 6 shows a first embodiment of the invention, providing feedback to a video display engine.

However, for such an ideal condition to exist, the frames must be uniform in size so that when one frame is removed from the buffer, another frame is ready to take its place in the buffer. As shown in FIG. 5, however, the frames are not uniform in size. Thus, the ideal condition does not exist in the device shown in FIG. 4. There are two negative effects which may result from this fact. First, buffer 402 may be filled to capacity and thus be unable to accept and store new data. We will call this situation "condition one." Second, buffer 402 may be empty and unable to provide information to device 107. We will call this situation "condition two." Each of these conditions results in degradation of the image displayed on display device 107 and is solved by providing feedback from device 107 to a video feed engine as shown in FIGS. 6 and 7 or to a bus controller as shown in FIGS. 8.

In condition one, buffer 402 is filled to capacity and can not receive data from subbus 204, thereby causing jump or jitter effects as explained below. This condition can result from subbus 204 containing too many bit lines, such that the data bandwidth to buffer 402 is too great. In other words, the flow of data into buffer 402 is greater than the flow of data out of buffer 402. If this imbalance continues for a long enough period of time, buffer 402 will become full and will not be able to receive additional data.

Similarly, condition two causes a frame to be displayed for too great a period of time and therefore causes resulting jitter or jump effects. This condition can result from subbus 204 containing too few bit lines, such that the data bandwidth to buffer 402 is too small. In other words, the flow of data into buffer 402 is smaller than the flow of data out of buffer 402. If this imbalance continues for a long enough period of time, buffer 402 will become empty and will not have a full frame to supply to display device 107.

For example, presume information related to at least a portion of frame X is being sent over subbus 204 for transfer to buffer 402. If buffer 402 is full, this information cannot be received at the time that the information is available. Subsequently, when frame X is to be displayed, some of the information corresponding to frame X is not in buffer 402. As a result, display device 107 is then forced to continue to display the preceding frame (for example, frame W) for an additional 1/30th of a second.

Over three successive frame periods, then, instead of display device 107 portraying images W, X and Y in the order required to accurately show a moving image, it portrays images W, W and Y. This causes image W to be displayed for two successive frames, or 1/15th of a second. The resulting effect is a jitter or jump as image W appears for too great a period and the display then jumps directly to image Y, never displaying image X.

The apparatus of FIG. 6 solves the problems of conditions one and two. FIG. 6 shows video feed engine 602 connected to bus 105. Video feed engine 602 provides the compressed video information to bus 105 which is subsequently received by display devices 107-111. Video feed engine 602 is also connected to display device 107 via feedback line 604. This connection allows video feed engine 602 to vary the bandwidth of the data transferred to buffer 402. For example, video feed engine 602 can vary the number of bit lines in subbus 204.

In accordance with the invention, video feed engine 602 varies the bandwidth of the data transferred to buffer 402 in accordance with information related to the amount of space available in buffer 402. For example, if display device 107 reads from buffer 402 a frame comprising a large amount of data, such as frame 1 shown in FIG. 5, then buffer 402 has vacant space equivalent to the size of frame 1. On the other hand, if display device 107 reads from buffer 402 a small amount of data, such as frame 2 shown in FIG. 5, then buffer 402 only has vacant space equivalent to the size of frame 2.

As display device 107 informs video feed engine 602 of the relative size of the frame or frames most recently read from buffer 402, video feed engine 602 can adjust the bandwidth of the data transfer to buffer 402. For example, video feed engine 602 can vary the number of bit lines associated with subbus 204 according to the information received over feedback line 604 from display device 107. In this way, video feed engine 602 can optimize the bandwidth allocation of bus 105 while minimizing the likelihood of dropped frames due to either condition one or condition two.

Alternatively, instead of display device 107 being connected to video feed engine 602, buffer 402 can be connected to video feed engine 602 via a feedback line. According to this alternative configuration, buffer 402 would provide similar information to video feed engine 602 as that supplied by display device 107 in the embodiment described above. Thus, as it provides a frame to display device 107, buffer 402 can inform video feed engine 602 of the size of the frame so that video feed engine 602 can adjust the bandwidth to buffer 402 accordingly.

Similarly, in addition to display device 107 providing feedback to video feed engine 602 over feedback line 604, display devices 109 and 111 can also provide feedback to video feed engine 602 over feedback lines connected between these devices and video feed engine 602 in a manner similar to the feedback provided by display device 107. Thus, video feed engine 602 can optimize the bandwidths to each of the buffers 402-406 based on feedback from each of the display devices.

To arbitrate likely contests between the devices for the bandwidth of data bus 105, video feed engine 602 can conduct tradeoff analyses to determine the optimal bandwidths to be allocated to each of the devices based on the respective data needs of the devices. These tradeoff analyses can be performed in accordance with rules stored in a memory, such as memory 701 shown in FIG. 7. Further, the rules for conducting these tradeoff analyses can be changed by a processor such as processor 703.

As discussed earlier with respect to buffer 402, buffers 404 and 406 can similarly provide feedback to video feed engine 602 in the alternative embodiment. Video feed engine 602 then conducts tradeoffs in a manner similar to that discussed above for the embodiment with feedback from the multiple display devices.

Alternatively, as shown in FIG. 8, feedback from a device such as display device 107 can be provided to data bus controller 802. In this embodiment, data bus controller 802 controls the bandwidth of the portion of data bus 105 that is associated with buffer 402 in accordance with the feedback received from display device 107. Similarly, devices 109 and 111 can provide feedback to data bus controller 802. Alternatively, one or more of buffers 402-406 could provide feedback to data bus controller 802. Data bus controller 802 can then reconfigure data bus 105 by, for example, reconfiguring the subbusses associated with the display devices and buffers according to the feedback.

In a manner similar to that described earlier, data bus controller 802 can be connected to a memory such as memory 701 shown in FIG. 7 in order to conduct tradeoff analyses in accordance with rules contained in the memory. Similarly, a processor such as processor 703 can change the rules contained in the memory to accommodate changing conditions of the data bus.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A method of allocating bandwidth among a plurality of devices communicatively connected through a data bus, the method comprising the steps of:

determining an availability of data storage space associated with at least one of the plurality of devices;

allocating portions of the data bus to the devices in response to said data storage space availability associated with said at least one device; and transmitting data between the devices on the allocated portions of the data bus;

wherein said data storage space availability is based on a measure of fullness of a buffer corresponding to the at least one device; and wherein said data storage space availability is provided as feedback from the buffer to a data bus controller which allocates the portions of the data bus.

2. The method recited in claim 1, wherein said portions of the data bus are subbusses, each comprising at least one bit line.

3. A method of allocating subbusses among a plurality of receiving devices communicatively connected to a data bus, the method comprising the steps of:

determining an availability of data storage space of at least one of the plurality of receiving devices based on an amount of data storage space available in a corresponding buffer;

feeding back a feedback signal indicating said amount of data storage space available to a bus controller;

allocating subbusses of the data bus to the receiving devices in response to said feedback signal; and transmitting data between the devices on the allocated subbusses.

4. The method recited in claim 3, further comprising using arbitration rules for assigning said subbusses.

5. The method recited in claim 4, wherein a processor changes said rules to accommodate changing conditions in the data bus.

6. A data communication system comprising:

a dynamically reconfigurable data bus;

a data bus controller connected to the dynamically reconfigurable data bus for configuring subbusses of the data bus;

a plurality of receiving devices with associated buffer data storage connected to the data bus; and a feedback connection from at least one of the receiving devices or its associated buffer data storage to the data bus controller, wherein the data bus controller configures the subbusses in accordance with feedback received over the feedback connection.

7. The communication system of claim 6, further comprising a memory connected to the data bus controller, the memory storing rules for use by the data bus controller in arbitrating the configuration of the subbusses.

8. The communication system of claim 7, further comprising a processor connected to the memory, the processor changing the rules to accommodate changing conditions in the data bus.

9. The communication system of claim 6, wherein said feedback connection comprises a circuit for determining the availability of data storage space in the associated buffer data storage for said at least one receiving device.

* * * * *